(12) United States Patent
Nagy et al.

(10) Patent No.: US 7,311,885 B2
(45) Date of Patent: Dec. 25, 2007

(54) BATCH REACTION SYSTEM

(75) Inventors: Anton John Nagy, Amsterdam (NL);
Peter John van den Brink,
Driebergen-Rijsenburg (NL); **Bashir
Husein Harji**, Cottenham (GB)

(73) Assignee: Avantium International A.B. (NL)

( * ) Notice: Subject to any disclaimer, the term of this patent is extended or adjusted under 35 U.S.C. 154(b) by 550 days.

(21) Appl. No.: 10/861,628

(22) Filed: Jun. 4, 2004

(65) Prior Publication Data

US 2004/0252580 A1 Dec. 16, 2004

Related U.S. Application Data

(63) Continuation-in-part of application No. PCT/EP02/13896, filed on Dec. 6, 2002.

(30) Foreign Application Priority Data

Dec. 7, 2001 (EP) .................. 01204736

(51) Int. Cl.
*B01J 8/04* (2006.01)
(52) U.S. Cl. ............... 422/191; 422/196; 422/197; 422/234; 422/235
(58) Field of Classification Search ............ 422/196, 422/197, 234, 235
See application file for complete search history.

(56) References Cited

U.S. PATENT DOCUMENTS 5,976,470 A 11/1999 Maiefski et al.
6,429,268 B1* 8/2002 Xiongwei ............ 526/64
6,592,751 B2* 7/2003 Haridas ............... 210/97
6,746,789 B1* 6/2004 Chen et al. ............ 429/19

FOREIGN PATENT DOCUMENTS

| EP | 1 174 185 A2 | 1/2002 |
| WO | WO 85/01224 | 3/1985 |
| WO | WO 00/45957 | 10/2000 |
| WO | WO 01/93998 | 12/2001 |

OTHER PUBLICATIONS

EPO Search Report—EP 01 20 4736 dated May 17, 2002.
PCT International Search Report—PCT/EP02/13896 dated Jun. 6, 2003.

* cited by examiner

*Primary Examiner*—N. Bhat
(74) *Attorney, Agent, or Firm*—Thomas, Kayden, Horstemeyer & Risley LLP; Todd Deveau

(57) ABSTRACT

A batch reaction system for simultaneously conducting reactions in at least two separate reactors (CSTR reactors), is provided wherein the at least two batch reactors, containing mixing means and a fluid inlet, a fluid feed common conduit is present for feed fluid to the reactors, which is connected to the inlet of each reactor of a fluid inlet conduits, and further includes a fluid discharge common conduit which is connected to the outlet of each reactor wherein in each fluid inlet conduit and/or in each fluid outlet conduit a non-return valve is arranged to prevent contamination but can provide simultaneous reactions wherein the reactors can be easily isolated from one another during reaction.

14 Claims, 1 Drawing Sheet

BATCH REACTION SYSTEM

RELATED APPLICATIONS

This application in a continuation-in-part of prior application No. PCT/EP02/13896 filed Dec. 6, 2002, which application claims priority to and the benefit of EP01204736.1 filed Dec. 7, 2001.

FIELD OF THE INVENTION

The invention relates to a batch reaction system for simultaneously conducting reactions in at least two separate reactors. The invention also relates to a process wherein use is made of such a batch reaction system.

BACKGROUND OF THE INVENTION

In practice many different batch reaction systems are known. In known batch reaction systems a gas feeding common conduit is used to feed gas to several parallel reactors and a gas discharge common conduit is used to discharge gas from these parallel reactors.

A problem that often occurs when using the known batch reaction system is that material from one reactor enters another reactor resulting in contamination. This for instance occurs when a volatile liquid is treated or reacted in a reactor under conditions of elevated temperature and pressure.

OBJECTS OF THE INVENTION

It is an object of the invention to avoid the above and other problems and to provide a batch reaction system wherein all reactors may easily be isolated from one another during reaction or treatment.

It is a further object of the invention to provide a batch reaction system in which a fluid may be continuously fed to and a fluid may be discharged from the separated reactors during the reaction, while retaining material to be treated or reacted in a reactor.

An even further object of the present invention is to provide an alternative batch reaction system.

SUMMARY OF THE INVENTION

In one embodiment the present invention provides a batch reaction system for simultaneously conducting reactions in at least two separate reactors, the reaction system comprising:

- at least two batch reactors, each batch reactor containing mixing means, and a fluid inlet;
- a fluid feeding common conduit for feeding fluid to the reactors, the fluid feeding common conduit being connected to the inlet of each reactor by a fluid inlet conduit;
- wherein a non-return valve is arranged in each fluid inlet conduit, which non-return valve closes in the direction of the fluid feeding common conduit.

In another embodiment the present invention provides a batch reaction system for simultaneously conducting reactions in at least two separate reactors, the reaction system comprising:

- at least two batch reactors, each batch reactor containing mixing means, a fluid inlet and a fluid outlet;
- a fluid discharge common conduit for discharging fluid from the reactors, the fluid discharge common conduit being connected to the fluid outlet of each reactor by a fluid outlet conduit,
- wherein a non-return valve is arranged in each fluid outlet conduit, which non-return valve closes in the direction of the reactor.

The present invention also envisages a batch reaction system formed by the combination of the systems discussed above.

The batch reaction system according to the invention provides in a surprisingly simple manner the ability to carry out reactions at elevated pressure and temperature using a limited amount of structural components, and prevents material from one reactor entering another reactor.

According to the present invention with a 'batch reactor' is meant any reactor designed to perform a batch reaction i.e. wherein at least one component is used in batch.

The batch reaction system according to the invention may be a pure batch system or a semi-batch system such as a system being 'batch' in fluid feed, a system being 'batch' in product, etc. If a pure batch system is used, then at least two batch reactors are filled with a certain amount of material to be reacted or treated, whereupon treatment or reaction takes place. After treatment or reaction, the batch reactor is emptied and filled again with a new amount of material.

If a system being 'batch' in fluid feed is used, a gas and/or liquid is fed to the reactors containing a liquid and/or solid. The fed gas or liquid is either consumed during reaction or is needed as an inert fluid.

The person skilled in the art will readily understand that any other (semi-)batch system may be used as long as at least one component is used in batch. Preferably, a closed system is used.

The fluid feeding common conduit may feed a gas or a liquid or a mixture thereof, depending on the case. In a particular embodiment the fluid feeding common conduit will feed a gas.

In a practical embodiment, each reactor also has a fluid outlet, and the reaction system further comprises a fluid discharge common conduit for discharging fluid from the reactors, the fluid discharge common conduit being connected to the fluid outlet of each reactor by a fluid outlet conduit. Herewith fluid may be added and removed. This type batch reactor configuration is commonly referred to as a constantly stirred tank reactor (CSTR).

Further it is possible that the fluid outlet conduit is a gas outlet conduit. Advantageously, each fluid outlet conduit is provided with a non-return valve.

According to a preferred embodiment each reactor comprises a condenser, such as a reflux condenser. Herewith the cross-contamination from one reactor to another reactor is further minimized, in particular if a volatile liquid is used as a material to be treated or reacted in the reactor. It has been found that, although the non-return valves prevent a general flow from a reactor to the fluid feeding common conduit, under some conditions diffusive gas/vapor transport of the material to be treated or reacted through the non-return valve may still take place. Using a condenser, this diffusive transport of condensable vapors will be further minimized. Further the condenser prevents loss of reaction liquid in the reactor, when a gas is flown through the reactor using the fluid inlet and gas outlet. Also, the ability to work in flow (i.e. a fluid may be added and removed constantly) means that dilute feeds may be used in order to minimize unwanted temperature effects resulting from rapid reaction exo/endotherms.

Further it is preferred that each fluid inlet conduit comprises a flow restrictor, preferably between the fluid feeding common conduit and the non-return valve, as this prevents condensation of solids/liquids in the flow restrictor.

Instead the flow restrictor may be placed between the non-return valve and the batch reactor.

It has been found that the incorporation of flow restrictors in each fluid inlet conduit upstream of the non-return valve prevents the problem that some of the non-return valves may remain closed because of e.g. dirt or contamination causing the valve to become sticky. Using the flow restrictors, equal amounts of gas can be continuously flown through all reactors, also ensuring that even non-return valves with slightly different opening pressures all open at the same time and that the flows through them are equal. Preferably, as the flow restrictors, pin holes or capillaries are used.

Groups of similar flow restrictors may be used in conjunction with groups or sets of reactors, allowing for different flow rates and pressures to be used in each reactor set. The flow through the restrictor may be varied by varying the resistance to flow (e.g. length of a capillary or diameter of a pin hole) and/or the difference in pressure between the upstream side of the capillary and the downstream side.

Also, it is preferred that each fluid outlet conduit comprises a flow restrictor, preferably between the reactor and the non-return valve.

Instead the flow restrictor may be placed between the non-return valve and the fluid discharge common conduit.

In another aspect, the invention relates to a process for simultaneously conducting reactions in at least two separate batch reactors using the batch reaction system according to the invention.

The persons skilled in the art will understand that the batch reaction system according to the invention provides a flexible tool for studying multiphase reactions (g/l/s) in either complete batch or semi-batch mode. An extremely diverse range of different types of reactions or treatments may be performed in a single unit.

Hereinafter the present invention will be illustrated in more detail by a drawing.

DETAILED DESCRIPTION OF PREFERRED EMBODIMENTS

Figure 1:
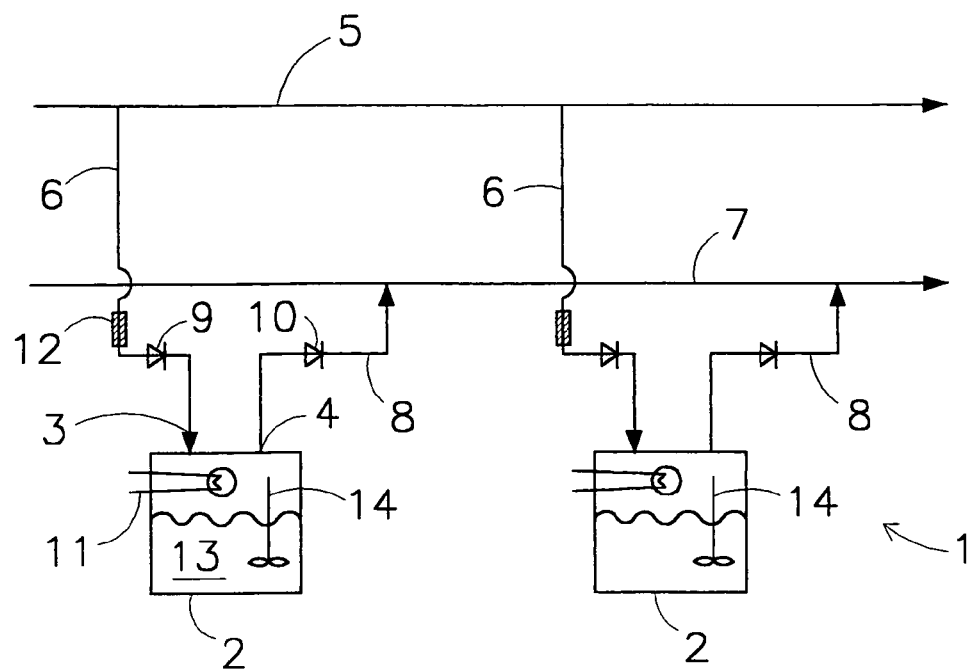
FIG. 1 a schematic cross-sectional view of the batch reaction system according to the invention.

FIG. 1 shows a schematic cross-sectional view of the batch reaction system 1 according to the invention for simultaneously conducting reactions in at least two separate, parallel batch reactors 2, in the shown embodiment in a closed system. In FIG. 1 only two batch reactors 2 are shown. The person skilled in the art will however readily understand that more than two, usually at least ten, batch reactors 2 may be used. Important according to the invention is that the reactors 2 can be isolated from the atmosphere.

Each batch reactor 2 contains mixing means 14, a fluid inlet 3 and a gas outlet 4. In this respect it is noted that the outlet 4, which may also be a fluid outlet, is, although preferred, not essential; i.e. the outlet 4 may, according to the invention, also be omitted. As mixing means 14, any suitable means may be used, in particular mechanical mixing means, such as a magnetic stirrer, overhead stirrer, orbital shaker or ultrasound. The system 1 further comprises a fluid feeding common conduit 5 for feeding gas or liquid to the reactors 2 during reaction. To this end the fluid feeding common conduit 5 is connected to the gas inlet 3 of each reactor 2 by a fluid inlet conduit 6. Also the system 1 comprises a gas discharge common conduit 7 for discharging gas from the reactors 2. Again, to this end the gas discharge common conduit 7 is connected to the gas outlet 4 of each reactor 2 by a gas outlet conduit 8. In the shown embodiment the gas discharge common conduit 7 is also a common conduit as this is preferred.

To prevent backflow from a reactor 2 to the fluid feeding common conduit 5, the fluid inlet conduit 6 comprises a non-return valve 9. To prevent backflow from the gas discharge common conduit 7 to the reactor 2, each gas outlet conduit 7 comprises a non-return valve 10. Preferably some or all reactors 2 comprise a condenser 11, such as a reflux condenser. Further it is preferred that each gas inlet conduit 6 comprises a flow restrictor 12 such as a capillary between the fluid feeding common conduit 5 and the non-return valve 9. In this respect it is noted that to function properly, the pressure drop in the flow restrictor 12 must be significantly higher than the opening pressure of the non-return valve 9.

The person skilled in the art will understand that further inlets and conduits may be present in order to feed further gases or liquids. Also further outlets may be present.

In use of the batch reaction system 1 according to the present invention, the batch reactors 2 are filled with one or more substances to be reacted or otherwise treated. This may be done using suitable feeding inlets, optionally using the common conduit 5 and inlet 3. Instead the batch reactors 2 may be provided with the substances, whereupon the batch reactors 2 are sealed using usual means (e.g. by a lid). Then the pressure and/or the temperature in the reactor 2 is increased, if desired. A solid or liquid material to be reacted or treated, is present in reactor 2 and denoted with 13. Some of the material 13 may evaporate. To prevent escaping of the evaporated material 13, the non-return valves 10 are present. Even diffusive gas/vapor transport of the material 13 over the gas outlet 8 may be prevented by use of the condenser 11 if the pressure drop over the check valve 10 is not sufficiently large to provide an effective seal.

In this respect it is noted that non-condensable gaseous components may still leave the reactor 2. However the material 13 is kept in the reactor 2 during the reaction or treatment. Of course, after the reaction or treatment has taken place, the material 13 may be discharged. If desired a gas, usually a not easily condensable gas such as air or $H_2$ may be fed to one or more of the reactors 2 continuously or intermittently during the reaction or treatment, using the fluid feeding common conduit 5. Also, gas may continuously or intermittently be discharged from the reactor 2 using the gas discharge common conduit 7.

An important aspect of the present invention is that the reactors 2 are isolated from one another during reaction or treatment. Therefore no material 13 to be treated or reacted in the reactor 2 will leave the reactor and enter another reactor 2, resulting in cross-contamination. Of course, non-condensable gases supplied via the inlets 3 may still leave the reactors 2 during reaction or treatment if this is desired.

The system 1 is therefore extremely suitable for the rapid, parallel screening of multiphase batch reactions at elevated temperatures and pressures, while the entering of material 13 from one reactor 2 to another reactor 2 is prevented or at least significantly minimized.

The person skilled in the art will understand that many modifications may be made. For instance, the reactors 2 may consist of metal tubes mounted in a rack for easy transport of the reactors. Further, additional means for adding one or more liquids may be provided. Also means for removing liquids may be provided, e.g. for liquid sampling analysis. Furthermore sensors may be provided for measuring e.g. pressure, pH, conductivity, gas consumption, liquid consumption, etc. Also, spectroscopic techniques may be incorporated.

Figure 2:
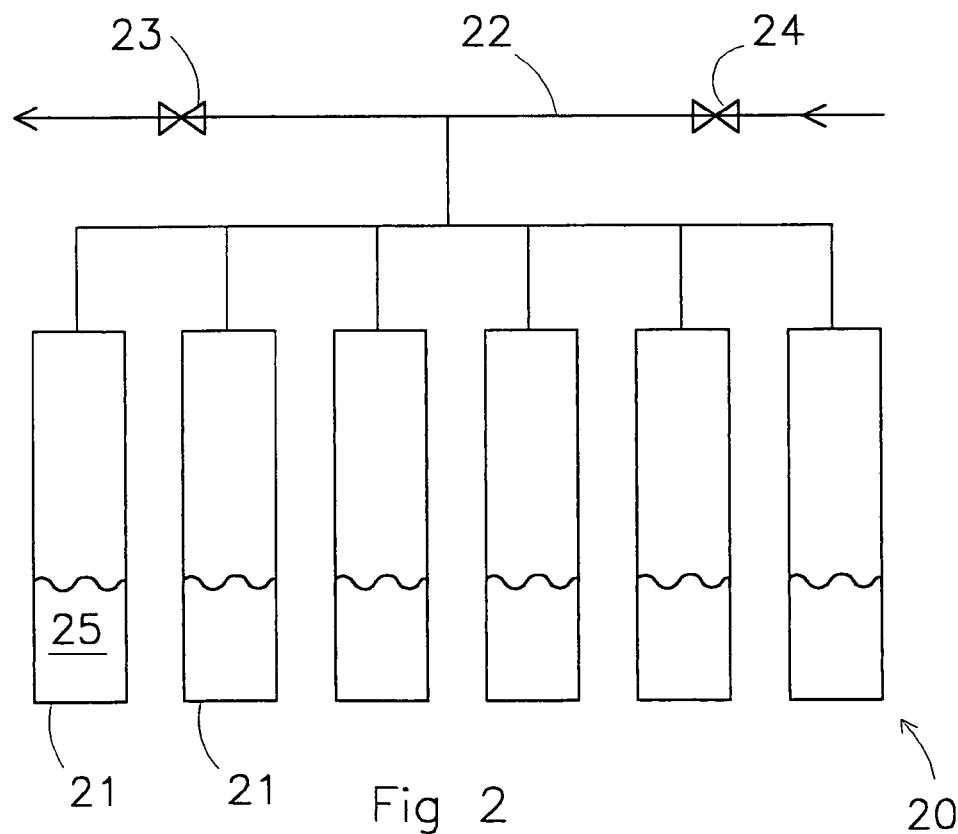
FIG. 2 a batch reaction system according to the state of the art.

FIG. 2 shows a batch reaction system 20 according to the state of the art. The batch reaction system 20 comprises a plurality of separated parallel reactors 21 in a closed system, wherein the gas feeding conduit 22 is at the same time a gas discharge conduit. Further the system 20 comprises a gas outlet valve 23 and a gas inlet valve 24. Of course further components may be present. In use of the batch reaction system 20 under elevated pressure and temperature material 25 from one reactor 21 may enter into another reactor, resulting in contamination. Also, it is not possible to continuously feed a gas to or discharge gas from the reactors 2, without contamination of the content 25 of the reactors 2.

What is claimed is:

1. A batch reaction system for simultaneously conducting reactions in at least two separate batch reactors, the batch reaction system comprising:
   at least two batch reactors, each batch reactor containing mixing means, and a fluid inlet; and
   a fluid feeding common conduit for feeding fluid to the reactors, the fluid feeding common conduit being connected to the inlet of each batch reactor by a fluid inlet conduit;
   wherein a non-return valve is arranged in each fluid inlet conduit, which non-return valve closes in the direction of the fluid feeding common conduit; and
   wherein each batch reactor also has a fluid outlet, and the batch reaction system further comprises a fluid discharge common conduit for discharging fluid from the batch reactors, the fluid discharge common conduit being connected to the fluid outlet of each batch reactor by a fluid outlet conduit, and a non-return valve arranged in each fluid outlet conduit, said non-return valve closing in the direction of the batch reactor.

2. A batch reaction system according to claim 1, wherein each batch reactor also has a gas outlet, and the batch reaction system further comprises a gas discharge common conduit for discharging gas from the reactors, the gas discharge common conduit being connected to the gas outlet of each reactor by a gas outlet conduit.

3. A batch reaction system according to claim 1, wherein each batch reactor comprises a condenser.

4. A batch reaction system according to claim 1, wherein each fluid inlet conduit comprises a flow restrictor.

5. A batch reaction system according to claim 1, wherein each fluid inlet conduit comprises a flow restrictor between the fluid feeding common conduit and the non-return valve.

6. A batch reaction system according to claim 1, wherein each batch reactor also has a fluid outlet, and the batch reaction system further comprises a fluid discharge common conduit for discharging fluid from the batch reactors, the fluid discharge common conduit being connected to the fluid outlet of each batch reactor by a fluid outlet conduit, and wherein each fluid outlet conduit comprises a flow restrictor.

7. A batch reaction system according to claim 1, wherein each batch reactor also has a fluid outlet, and the batch reaction system further comprises a fluid discharge common conduit for discharging fluid from the batch reactors, the fluid discharge common conduit being connected to the fluid outlet of each batch reactor by a fluid outlet conduit, and wherein each fluid outlet conduit comprises a flow restrictor between the batch reactor and the non-return valve.

8. A batch reaction system for simultaneously conducting reactions in at least two separate reactors, the batch reaction system comprising:
   at least two batch reactors, each batch reactor containing mixing means, a fluid inlet and a fluid outlet;
   a fluid discharge common conduit for discharging fluid from the batch reactors, the fluid discharge common conduit being connected to the fluid outlet of each batch reactor by a fluid outlet conduit;
   wherein a non-return valve is arranged in each fluid outlet conduit, which non-return valve closes in the direction of the batch reactor.

9. A batch reaction system according to claim 8, wherein the batch reaction system further comprises a fluid feeding common conduit for feeding fluid to the reactors, the fluid feeding common conduit being connected to the inlet of each reactor by a fluid inlet conduit.

10. A batch reaction system according to claim 8, wherein each batch reactor comprises a condenser.

11. A batch reaction system according to claim 8, wherein each fluid outlet conduit comprises a flow restrictor.

12. A batch reaction system according to claim 8, wherein each fluid outlet conduit comprises a flow restrictor between the batch reactor and the non-return valve.

13. A process for simultaneously conducting reactions in at least two separate batch reactors using the batch reaction system according to claim 1.

14. A process for simultaneously conducting reactions in at least two separate batch reactors using the batch reaction system according to claim 8.

* * * * *